US012677797B2

(12) United States Patent
Corbett

(10) Patent No.: US 12,677,797 B2
(45) Date of Patent: Jul. 14, 2026

(54) COOLER-MOUNTABLE PET BOWL

(71) Applicant: Peter J. Corbett, Bellaire, TX (US)

(72) Inventor: Peter J. Corbett, Bellaire, TX (US)

( * ) Notice: Subject to any disclaimer, the term of this patent is extended or adjusted under 35 U.S.C. 154(b) by 0 days.

(21) Appl. No.: 18/805,835

(22) Filed: Aug. 15, 2024

(65) Prior Publication Data

US 2026/0047547 A1    Feb. 19, 2026

(51) Int. Cl.
*A01K 5/01* (2006.01)

(52) U.S. Cl.
CPC ................................. *A01K 5/0114* (2013.01)

(58) Field of Classification Search
CPC .................................................... A01K 5/0114
See application file for complete search history.

(56) References Cited

U.S. PATENT DOCUMENTS

| | | | | |
|---|---|---|---|---|
| 4,399,772 | A * | 8/1983 | Salinas | A01K 5/0142 |
| | | | | 119/51.5 |
| 5,000,124 | A * | 3/1991 | Bergen | A01K 5/0114 |
| | | | | 248/295.11 |
| 5,501,176 | A * | 3/1996 | Tully | A01K 5/0114 |
| | | | | 119/61.57 |
| 6,474,097 | B2 * | 11/2002 | Treppedi | F25D 3/08 |
| | | | | 280/30 |
| 7,124,709 | B1 * | 10/2006 | Greer | A01K 5/0114 |
| | | | | 119/61.5 |
| 7,140,507 | B2 * | 11/2006 | Maldonado | A45C 11/20 |
| | | | | 220/592.2 |
| 7,318,391 | B2 * | 1/2008 | Brillon | A01K 5/0114 |
| | | | | 119/51.5 |

| | | | | |
|---|---|---|---|---|
| 7,389,608 | B1 * | 6/2008 | MacKay | A01K 97/20 |
| | | | | 206/315.11 |
| D727,457 | S | 4/2015 | Seiders | |
| D800,396 | S * | 10/2017 | Coviello | D30/129 |
| 9,901,218 | B2 | 2/2018 | Fill | |
| 9,913,464 | B1 * | 3/2018 | Stokes | F16M 13/02 |
| D820,535 | S * | 6/2018 | Caruso | D30/129 |
| 10,018,408 | B2 * | 7/2018 | Murphy | F16M 13/02 |
| 10,154,660 | B1 * | 12/2018 | Matthews | A01K 97/10 |
| D856,091 | S | 8/2019 | Winterhalter et al. | |
| 10,743,670 | B2 | 8/2020 | Winterhalter et al. | |

(Continued)

FOREIGN PATENT DOCUMENTS

WO    WO-2023019277 A1 *    2/2023    ............. F16M 13/02

OTHER PUBLICATIONS

Vadya-Zanino online article titled "Injection molding vs 3D printing: Ten considerations" publication date: Feb. 1, 2023 https://bmf3d.com/blog/injection-molding-vs-3d-printing-ten-considerations/ (Year: 2023).*

(Continued)

*Primary Examiner* — Terrell L Mckinnon
*Assistant Examiner* — Ding Y Tan
(74) *Attorney, Agent, or Firm* — C. Tumey Law Group PLLC

(57) ABSTRACT

A variety of methods, systems, and apparatus are disclosed, including, in one embodiment, an example apparatus for mounting to a container. The container may comprise a support bracket comprising a hook portion and a stem that extends downwardly from the hook portion. The container may further comprise a first container coupled to the support bracket. The container may further comprise a second container coupled to the support bracket.

8 Claims, 5 Drawing Sheets

(56) References Cited

U.S. PATENT DOCUMENTS

| | | | | |
|---|---|---|---|---|
| 11,104,484 | B2 | 8/2021 | Slattery | |
| 11,414,238 | B2 * | 8/2022 | Ahlström | F25D 23/028 |
| 11,793,285 | B2 * | 10/2023 | Bland | B65F 1/1415 |
| 11,944,185 | B2 * | 4/2024 | Slattery | A45C 13/30 |
| 2005/0072366 | A1 * | 4/2005 | Hammer | A01K 5/0114 119/61.57 |
| 2005/0263527 | A1 * | 12/2005 | Maldonado | A45C 13/40 220/592.2 |
| 2009/0056636 | A1 * | 3/2009 | Deese | A01K 5/0142 119/61.53 |
| 2010/0096521 | A1 * | 4/2010 | White | A47G 23/0225 248/314 |
| 2010/0147224 | A1 * | 6/2010 | Aletti | B66F 11/00 119/174 |
| 2013/0014701 | A1 * | 1/2013 | Gass | A01K 7/027 119/72 |
| 2018/0141718 | A1 * | 5/2018 | Ahlström | B65D 25/20 |
| 2019/0092528 | A1 * | 3/2019 | Slattery | B65D 81/3813 |
| 2019/0127109 | A1 | 5/2019 | Johnson | |
| 2019/0161240 | A1 * | 5/2019 | Ahlström | A45F 3/46 |
| 2020/0385172 | A1 * | 12/2020 | Reed | F16B 2/08 |
| 2021/0112987 | A1 | 4/2021 | Winterhalter et al. | |
| 2021/0274920 | A1 | 9/2021 | Slattery | |
| 2021/0284426 | A1 * | 9/2021 | Kalajyan | B65D 81/3813 |

OTHER PUBLICATIONS

JLCPCB.com online blog post titled "Injection Molding vs 3D Printing: A comparative Study" dated Jan. 11, 2024, https://jlc3dp.com/blog/injection-molding-vs-3d-printing (Year: 2024).*

Lucky Dog ® double fixed position food and water dog bowl online product page. https://luckydogdirect.com/products/lucky-dog-double-fixed-position-food-water-kennel-dog-bowls, dated by archive.org to be Aug. 8, 2022 (Year: 2022).*

Yeti Boomer non-slip dog bowl sold on amazon.com dated Aug. 26, 2019 (Year: 2019).*

Docktail Bar. "Docktail Bar Yeti Tundra Cooler Mount and Table System." Docktail Bar Company Website, https://docktailbar.com/collections/docktail-bar-yeti-tundra-series-cooler-mount-and-table-system/products/docktail-yeti-tundra-cooler-mount-and-table-system-patent-pending. Accessed Jul. 24, 2024.

Yeti Coolers LLC. "Beverage Holder." Yeti Company Website, https://www.yeti.com/accessories/beverage-holder/20110010023.html. Accessed Jul. 24, 2024.

Yeti Coolers LLC. "Roadie® Wheeled Cooler Cup Caddy." Yeti Company Website, https://www.yeti.com/20020020021.html. Accessed Jul. 24, 2024.

Wild Coolers Co. LLC. "Double Cup Holder." Wild Coolers Company Website, https://www.wildcoolers.com/products/double-cup-holder?_pos=1&_sid=775008112&_ss=r. Accessed Jul. 24, 2024.

Wild Coolers Co. LLC. "Single Cup Holder." Wild Coolers Company Website, https://www.wildcoolers.com/products/single-cup-holder?_pos=2&_sid=775008112&_ss=r. Accessed Jul. 24, 2024.

Cooler Clips. "CoolerClip™ For Yeti Coolers 35Qt and Larger." Cooler Clips Company Website, https://www.coolerclips.com/collections/all/products/double-coolerclip%E2%84%A2-large. Accessed Jul. 24, 2024.

Cooler Works. "Double Cup Holder—New Model." Cooler Works Company Website, https://www.coolerworks.com/yeti-products/double-cup-holder-1. Accessed Jul. 24, 2024.

Cooler Works. "Double Cup Holder—Yeti." Cooler Works Company Website, https://www.coolerworks.com/yeti-products/double-cup-holder. Accessed Jul. 24, 2024.

Cooler Works. "Yeti—Double Gun Rack—Black." Cooler Works Company Website, https://www.coolerworks.com/yeti-products/a6pt4orrbnnt93ko5c44bqdxxt2mn4. Accessed Jul. 24, 2024.

Cooler Works. Yeti—Offshore Rod Rack with Cup Holder. Cooler Works Company Website, https://www.coolerworks.com/yeti-products/offshore-rod-rack-w-cup-holder. Accessed Jul. 24, 2024.

Tideline 3D. "Cup Holder for Yeti Tundra Coolers." Tideline 3D Company Website, https://tideline3d.com/products/cup-holder-for-yeti-cooler?variant=41929000616118. Accessed Jul. 24, 2024.

Tideline 3D. "Fishing Rod Holder for Yeti Tundra Coolers." Tideline 3D Company Website, https://tideline3d.com/collections/accessories-for-yeti-coolers/products/fishing-rod-holder-for-yeti-cooler. Accessed Jul. 24, 2024.

Beach Fishing Carts. "Denali 45/75 QT Cooler Cup Holder." Beach Fishing Carts Company Website, https://beachfishingcarts.com/products/denali-45-75-qt-cup-holder. Accessed Jul. 24, 2024.

Yeti Coolers LLC. "Locking Bracket." Yeti Company Website, https://www.yeti.com/coolers/coolers-accessories/20010020004.html. Accessed Jul. 24, 2024.

Yeti Coolers LLC. "Security Cable Lock & Bracket." Yeti Company Website, https://www.yeti.com/coolers/coolers-accessories/20010030004.html. Accessed Jul. 24, 2024.

Yeti Coolers LLC. "Tie-Down Kit." Yeti Company Website, https://www.yeti.com/accessories/cooler-tie-down-kit/20110010024.html. Accessed Jul. 24, 2024.

Yeti Coolers LLC. "Rod Holster." Yeti Company Website, https://www.yeti.com/accessories/fishing-rod-holster/20110010022.html. Accessed Jul. 24, 2024.

Orca, A Gathr Outdoors Company. "Fish Rod Holder Black." Orca Company Website, https://orcacoolers.gathroutdoors.com/products/black-fish-rod-holder. Accessed Jul. 24, 2024.

Snap'y Fit. "Snap'y Fit® Food & Water Bowl." MidWest Homes for Pets Company Website, https://www.midwesthomes4pets.com/product/dogs/kits-accessories-supplies-dogs/snapy-fit-food-water-bowl/. Accessed Jul. 24, 2024.

EveryYay. "EveryYay Happy Place Grey Food & Water Crock for Pets." Lowe's Company Website, https://www.lowes.com/pd/EveryYay-EveryYay-Happy-Place-Grey-Food-Water-Crock-for-Pets-20-fl-oz/5013087413. Accessed Jul. 24, 2024.

Petmate. "Double Water Cup For Kennel." Petmate Company Website, https://www.petmate.com/products/double-water-cup-for-kennel?_pos=11&_sid=42e3d04d8&_ss=r. Accessed Jul. 24, 2024.

All Living Things. "All Living Things® Food & Water Bird Cup." PetSmart Company Website, https://www.petsmart.com/bird/bowls-and-feeders/cups/all-living-things-food-and-water-bird-cup-14054.html?cgid=400101&fmethod=Browse. Accessed Jul. 24, 2024.

Top Paw. "Top Paw® Stainless Steel Crate Crock Bone White Feeding Bowl." PetSmart Company Website, https://www.petsmart.com/dog/bowls-and-feeders/food-and-water-bowls/top-paw-stainless-steel-crate-crock-bone-white-feeding-bowl-80213.html?cgid=100277&fmethod=Browse. Accessed Jul. 24, 2024.

Petmate. "Petmate No Spill Kennel Cup Double Diner." Petmate Company Website, https://www.petmate.com/products/petmate-no-spill-kennel-cup-double-diner?_pos=2&_sid=42e3d04d8&_ss=r. Accessed Jul. 24, 2024.

* cited by examiner

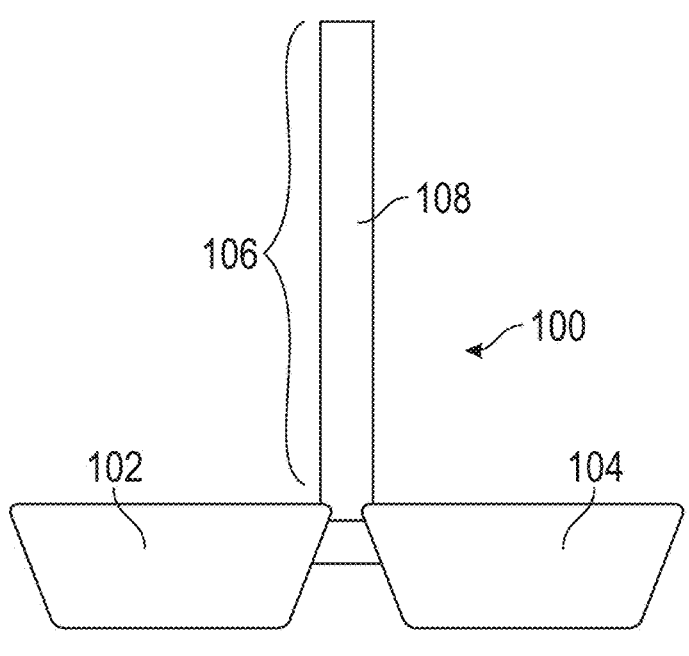
FIG. 3
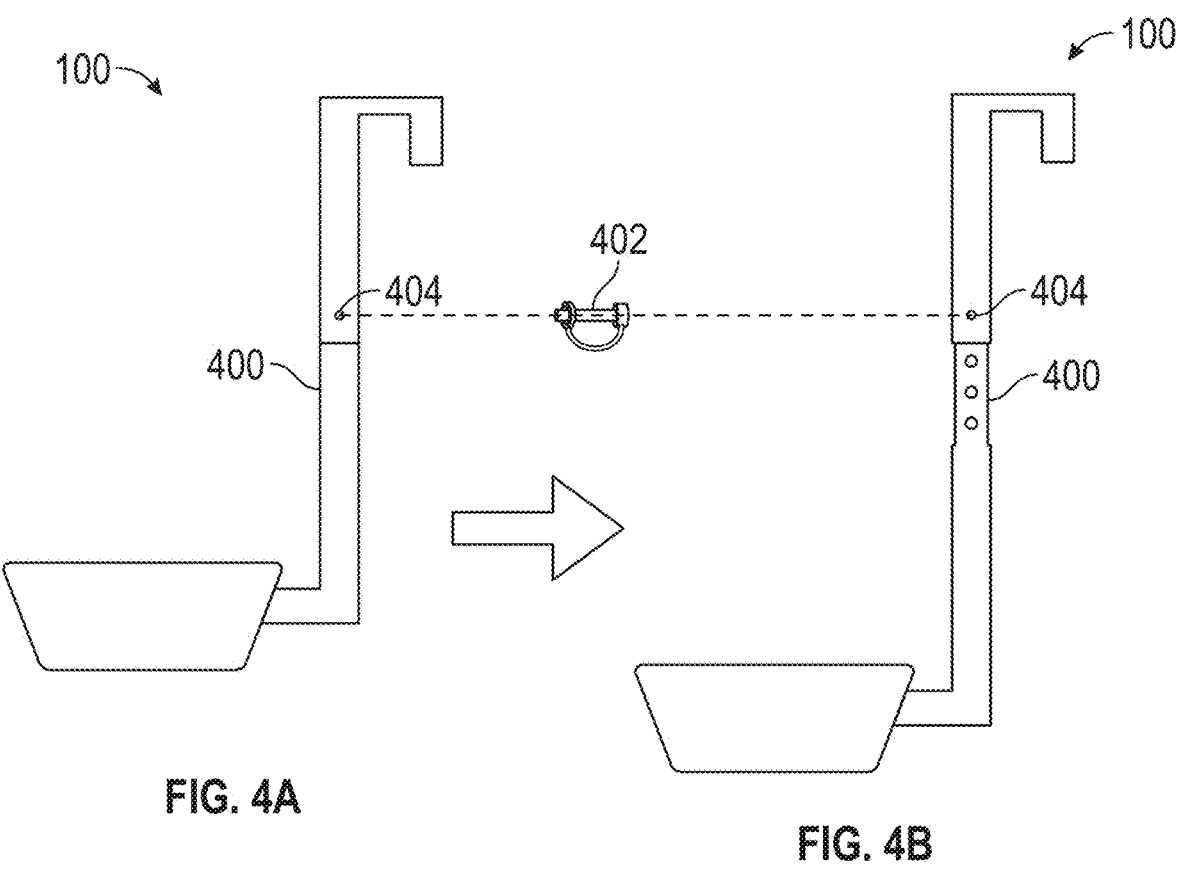
FIG. 4A
FIG. 4B

COOLER-MOUNTABLE PET BOWL

BACKGROUND

Insulation storage containers are typically portable storage containers for keeping feed, drink, or other items cool. Ice may be placed into the insulation storage container to maintain temperature. These insulation storage containers have become a commonplace item, with many people finding use for them in their day to day personal and business activities. Some example insulation storage containers may be provided with a vertical slot incorporated into the container's sidewall construction. The slot may typically be used as attachment point for securing the insulation storage container to a vehicle or other structure. The containers are configured such that the lid may still be opened and closed when the attachment point is in use.

SUMMARY

Disclosed herein is an example apparatus for mounting to a container. The container may comprise a support bracket comprising a hook portion and a stem that extends downwardly from the hook portion. The container may further comprise a first container coupled to the support bracket. The container may further comprise a second container coupled to the support bracket.

Further disclosed herein is another example apparatus for mounting to a container. The apparatus may comprise a support bracket comprising a hook portion and a stem that extends downwardly from the hook portion. The hook portion may comprise a first extension and a second extension, wherein the first extension extends at a right angle from a first end of the stem, wherein the first extension has a length of about 1 inch to about 5 inches and a thickness of about 0.125 inches to about 1.35 inches, wherein the second extension has a length of about 0.5 inch to about 5 inches and a thickness of about 0.125 inches to about 1.5 inches, and wherein the stem has a length of about 3 inches to about 15 inches. The apparatus may further comprise a spacer at a second end of the stem. The apparatus may further comprise a container coupled to the spacer and having a volume of about 6 fluid ounces to about 160 fluid ounces. The apparatus may be integrally formed.

Further disclosed herein is an example container system. The container system may comprise a container comprising sidewalls, a bottom, and a top, wherein at least one sidewall has a slot in an upper surface. The container system may further comprise an apparatus for mounting to the container, wherein the apparatus comprises a support bracket comprising a hook portion and a stem that extends downwardly from the hook portion, a first container/vessel, and a second container, wherein the hook portion is configured to interact with the slot to mount the apparatus to the container.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

These drawings illustrate certain aspects of some of the embodiments of the present invention and should not be used to limit or define the invention.

FIG. 3 is a front view of a pet bowl us for mounting to an insulation storage container in accordance with some embodiments of the present disclosure.

FIGS. 4A and 4B illustrate a telescoping step of a pet bowl for mounting to an insulation storage container in accordance with some embodiments of the present disclosure.

DETAILED DESCRIPTION

Disclosed herein are pet bowls and, more particularly, pet bowls with an attachment for mounting to a portable insulation storage container, commonly called a "cooler" or "ice chest." Among other advantages, mounting of the pet bowl to the insulation storage container enables an added convenience of the use of pet feeding or drinking bowls at a height ideal for pets to access, while also keeping the pet bowl's contents elevated off the ground.

When traveling with their pets, a pet owner may be required to provide their pet with food and water. The food and/or water bowls, for example, may be placed on the ground at the location needed to provide access for the pet. If outside, this would typically be on the ground where the pet bowls could easily be contaminated, for example, with bugs, insects, ground crawling pests, dirt, or other debris. Accordingly, example embodiments provide a pet bowl that can be mounted to an insulation storage container while supporting the pet bowl off the ground. Example embodiments may include a pet bowl that includes first and second containers coupled to a support bracket that mount to the insulation storage container. For example, insulation storage containers may include a vertical slot incorporated into the container's sidewall construction, enabling a mounting point for the support bracket. Accordingly, the pet bowl may be easily portable with quick installation onto, and removal from, an insulation storage container by a user. Accordingly, the user may be able to provide food and/or water access to a pet, at a low enough height appropriate for a pet, while also keeping the bowls elevated off the ground to help prevent ingression of bugs, dirt, or other debris that might otherwise be able to enter into typical pet bowls used on ground level.

Figure 1:
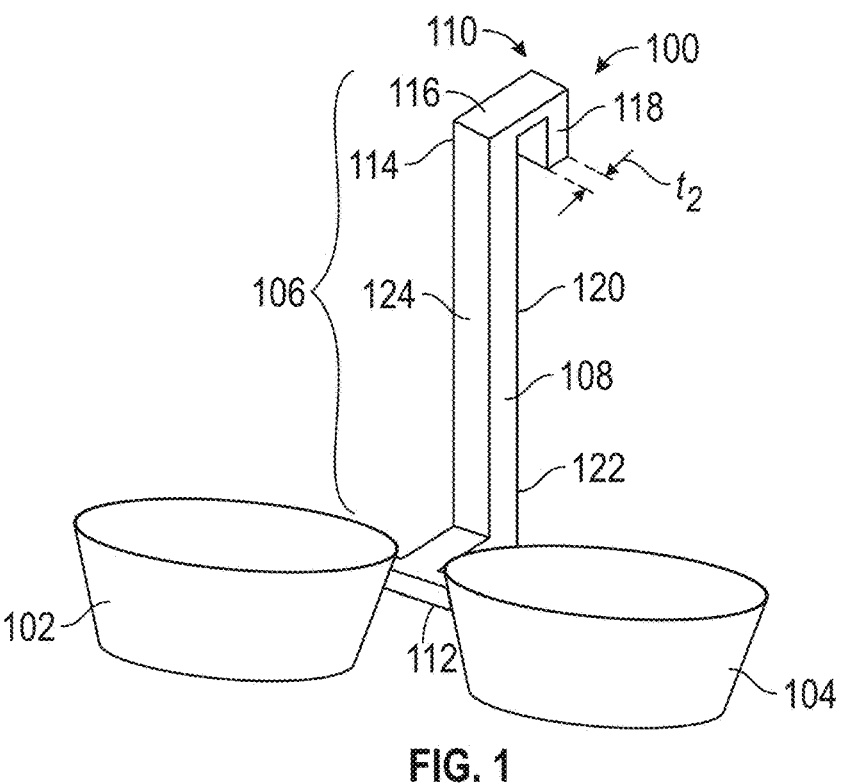
FIG. 1 is an orthographic view of a pet bowl for mounting to an insulation storage container in accordance with some embodiments of the present disclosure.

FIG. 1 illustrates a pet bowl 100 in accordance with some embodiments of the present disclosure. As illustrated, the pet bowl 100 may include a first container 102, a second container 104, and a support bracket 106. The support bracket 106 may be configured for mounting the pet bowl 100 to an insulation storage container (e.g., insulation storage container 700 on FIGS. 7 and 8). The first container 102 and the second container 104 may be configured to hold food, water, or other consumables for a pet. In the illustrated embodiment, the first container 102 and second container 104 are attached to the support bracket 106.

The first container 102 and the second container 104 may have any suitable volume for holding food and/or water for the pet. For example, the first container 102 and the second container 104 may each individually have a volume of about 6 fluid ounces to about 160 fluid ounces, about 6 fluid ounces to about 80 fluid ounces, about 6 fluid ounces to about 30 fluid ounces, or any number in between. In addition, while FIG. 1 illustrates the first container 102 and the second container 104 as being the same size, they do not necessarily have to be the same size but can be sized differently in accordance with example embodiments.

While FIG. 1 illustrates, the first container 102 and the second container 104 as having a bowl shape, the first container 102 and the second container 104 may be otherwise configured so long as they are able to hold the food and/or water for the pet. For example, the first container 102 and the second container 104 do not have to be round containers but can other configurations, including polygonal, elliptical, and irregular.

The first container 102 and the second container 104 may be positioned with respect to one another as desired for a particular application. As illustrated in FIG. 1, the first container 102 and the second container 104 may be spaced next to one another with a small space (e.g., 0.125 inch to 4 inches) between the bowl edges. However, they may be otherwise positioned. For example, the first container 102 and the second container 104 be placed close to one another and, in some embodiments, the first container 102 and the second container 104 may be touching.

The support bracket 106 supports the first container 102 and the second container 104. In the illustrated embodiments, the support bracket 106 includes a stem 108, hook portion 110, and a spacer 112. The stem 108 may extend between the hook portion 110 and the spacer 112. While the stem 108 is shown as having a generally square-shaped cross-section, the stem 108 may be otherwise configured, for example, with cross section that is generally circular, rectangular, or other another suitable shape.

The hook portion 110 may be coupled to a first end 114 of the stem 108. In the illustrated embodiment, the hook portion 110 is in the generally form of an L-shaped bracket with a first extension 116 and a second extension 118. The first extension 116 may extend outwardly from a back side 120 of the stem 108. As illustrated, the first extension 116 may extend generally at a right angle from the stem 108. The second extension 118 extends from the first extension 116 such that the first extension 116 and the second extension 118 generally form a hook shape. As illustrated, the second extension 118 may extend downwardly from the first extension 116.

The support bracket 106 may hold and support the first container 102 and the second container 104. As illustrated, the first container 102 and the second container 104 may be coupled to a second end 122 of the stem 108. In the illustrated embodiment, a spacer 112 is formed at the second end 122 of the stem 108 with the first container 102 and the second container 104 individually coupled to the spacer 112. The spacer 112, for example, may be positioned the first container 102 and the second 104 a pre-determined spacing from the stem 108 and, thus, from the insulation storage container when in use). As illustrated, the spacer 112 may hold and support the first container 102 and the second container 104 on a front side 124 of the stem 108. Alternatively, the first container 102 and the second container 104 may be coupled to lateral sides of the stem 108 or otherwise attached to the stem 108 with or without the spacer 112.

Figure 2:
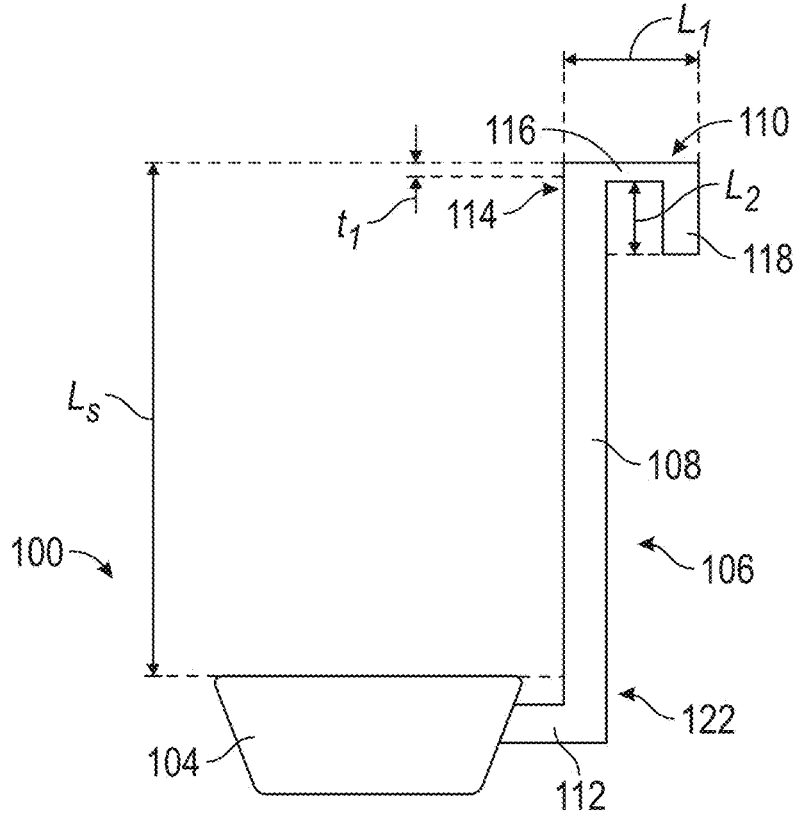
FIG. 2 is a side view of a pet bowl for mounting to an insulation storage container in accordance with some embodiments of the present disclosure.

FIG. 2 illustrates a side view of the pet bowl 100 of FIG. 1 in accordance with example embodiments. As illustrated, the pet bowl 100 includes a support bracket 106 having a stem 108, a hook portion 110 at a first end 114, and a spacer 112 at a second send 122. The first container 102 (not separately shown) and the second container 104 may be coupled to the support bracket 106, for example, at the second end 122 of the stem 108.

The stem 108 may be configured, for example, to support and hold the first container 102 and the second container 104 at a preselected distance. For example, the stem 108 may extend downwardly from the hook portion 110, for example, to hold the first container 102 and the second container 104 at a lower portion for the pet. In some embodiments, the stem 108 may have length ($L_s$) of about 3 inches to about 25 inches, about 3 inches to about 15 inches, about 3 inches to about 10 inches, about 6 inches to about 25 inches, about 6 inches to about 20 inches, or about 6 inches to about 15 inches.

The hook portion 110 of the support bracket 106 may be configured, for example, to attach the pet bowl 100 to an insulation storage container. Accordingly, the hook portion 110 may be sized to hook into a slot in the insulation storage container while allowing the corresponding lid to close. For example, the first extension 116 may have length ($L_1$) of about 1 inch to about 5 inches or about 1 inch to about 3 inches. By way of further example, the first extension 116 may have a thickness ($t_1$) of about 0.1 inches to about 1.5 inches, about 0.125 inches to about 1.35 inches, or about 0.125 inches to about 1 inch. By way of further example, the second extension 118 may have a length ($L_2$) of about 0.5 inches to about 5 inches or about 1 inch to about 3 inches. With reference now to FIG. 1, the second extension 118 may have a thickness ($t_2$) of about 0.125 inches to about 1.5 inches, or about 0.125 inches to about 1 inch. It should be understood that these dimensions are representative examples and that dimensions outside these disclosed ranges may be suitable as desired for a particular application.

FIG. 3 illustrates a front view of the pet bowl 100 of FIG. 1 in accordance with example embodiments. As illustrated, the pet bowl 100 includes a support bracket 106 having a stem 108 with a first container 102 and a second container 104 may be coupled to the support bracket 106.

FIGS. 4A and 4B illustrate a pet bowl 100 with a telescoping stem 400 in accordance with example embodiments. It may be desired, for example, to have the support bracket 106 of the pet bowl 100 to have an adjustable length. Accordingly, example embodiments of the support bracket 106 may include a telescoping stem 400. With the telescoping stem 400, the length of the support bracket 106 may be adjusted as desired for a particular applicant. A retaining pin 402 may be inserted into an aperture 404 in the telescoping stem 400 to secure the telescoping stem 400 in a particular configuration. FIG. 4A illustrates the telescoping stem 400 in an unextended configuration. For extension, the retaining pin 402 may be removed and the telescoping stem 400 extended into an extended configuration, as shown in FIG. 4B. It should be understood that other mechanisms may be used for securing the telescoping stem 400 in a particular position, such as a set screw, spring button, spring clip, latch, quick release latch, snap fastener, nut and bolt, binding strap, cam buckle, buckle latch, tie down strap, buckle strap, hook & loop strap, for example. In addition, while the telescoping embodiment is shown on FIGS. 4A and 4B for changing the length of the support bracket 106, example embodiments for adjusting length are not limited to telescoping but, rather, any suitable technique for adjusting length may be used in accordance with example, embodiments.

Figure 5:
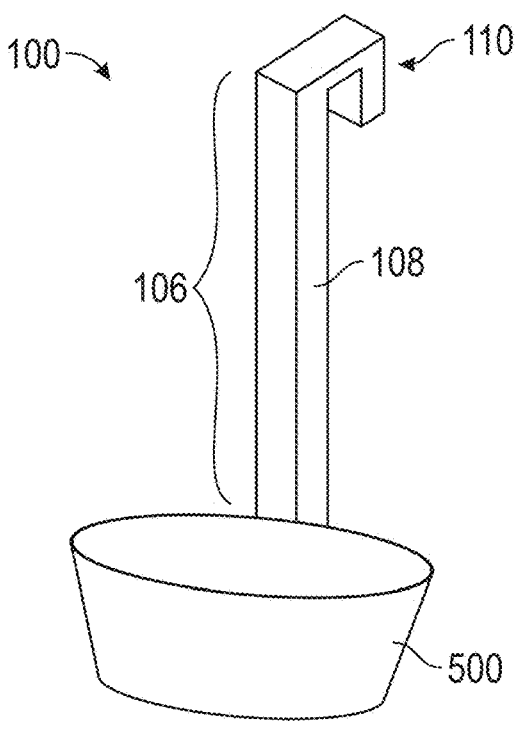
FIG. 5 is an orthographic view of a pet bowl for mounting to an insulation storage container in accordance with some embodiments of the present disclosure.

FIG. 5 illustrates a pet bowl 100 in accordance with alternative embodiments. As illustrated, the pet bowl 100 includes a support bracket 106 having a stem 108 and a hook portion 110. However, rather than having a pair of containers (e.g., first container 102 and second container 104 on FIGS. 1-4B), the pet bowl 100 contains only one container 500 coupled to the stem 108 at an opposite end from the hook portion 110. While only a single container 500 is shown FIG. 5, example embodiments may include 2, 3, or more containers as desired for a particular application.

Figure 6:
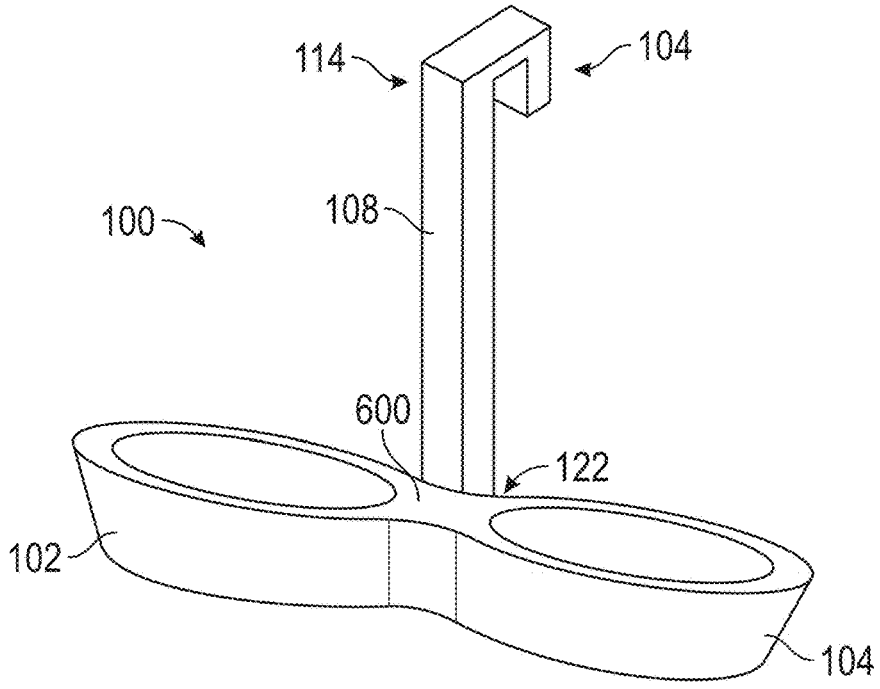
FIG. 6 is an orthographic view of a pet bowl for mounting to an insulation storage container with an integrally formed space in accordance with some embodiments of the present disclosure.

FIG. 6 illustrates a pet bowl 100 in accordance with alternative embodiments. As illustrated, the pet bowl 100 includes a support bracket 106 having a stem 108 and a hook portion 110. The stem 108 has a first end 114 and second end 122. The pet bowl 100 may further include a first container 102 and a second container 104. As illustrated, the first container 102 and the second container 104 may be coupled to the stem 108 at the second end 122. In the illustrated embodiment, the first container 102 and the second container 104 form a container unit 600 that may be directly coupled to the stem 108 instead of using a spacer (e.g., spacer 112 on FIG. 1).

Figure 7:
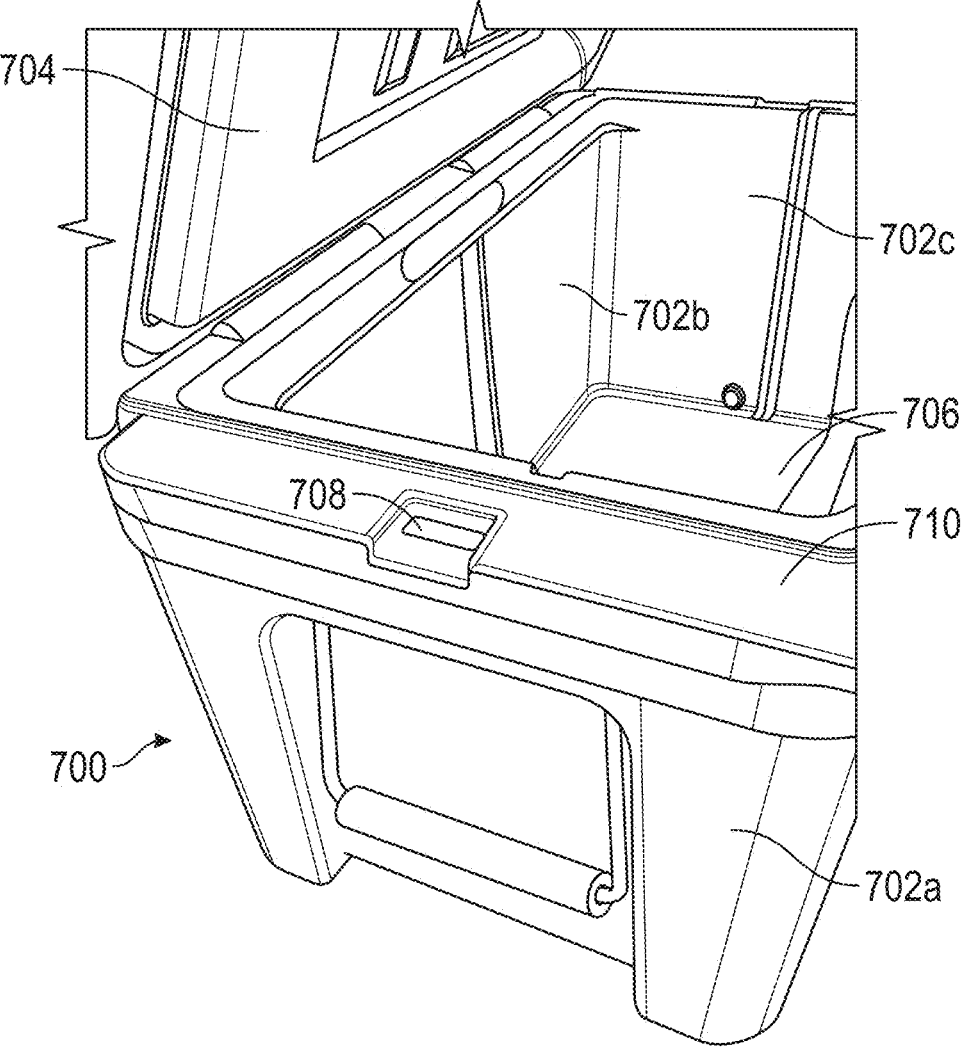
FIG. 7 illustrates an insulation storage container.

FIG. 7 illustrates an insulation storage container 700. As illustrated, the insulation storage container 700 may include sidewalls 702a, 702b, 702c, lid 704 and bottom 706. The sidewalls 702a, 702b, 702c may be collectively referred to herein as sidewalls 702a, 702b, 702c and individually referred to as first sidewall 702a, second sidewall 702b, and third sidewall 702c. The fourth sidewall is not shown in FIG. 7. The sidewalls 702a, 702b, 702c together with the lid 704 and bottom 706 may together form an exterior of the insulation storage container 700 for enclosing storage space. In the illustrated embodiment, a slot 708 may be formed in an upper surface 710 of the first sidewall 702a. The slot 708 does not necessarily need to completely penetrate with an open bottom, but rather may only extend a certain depth into the first sidewall 702a with a closed bottom in some embodiments.

Figure 8:
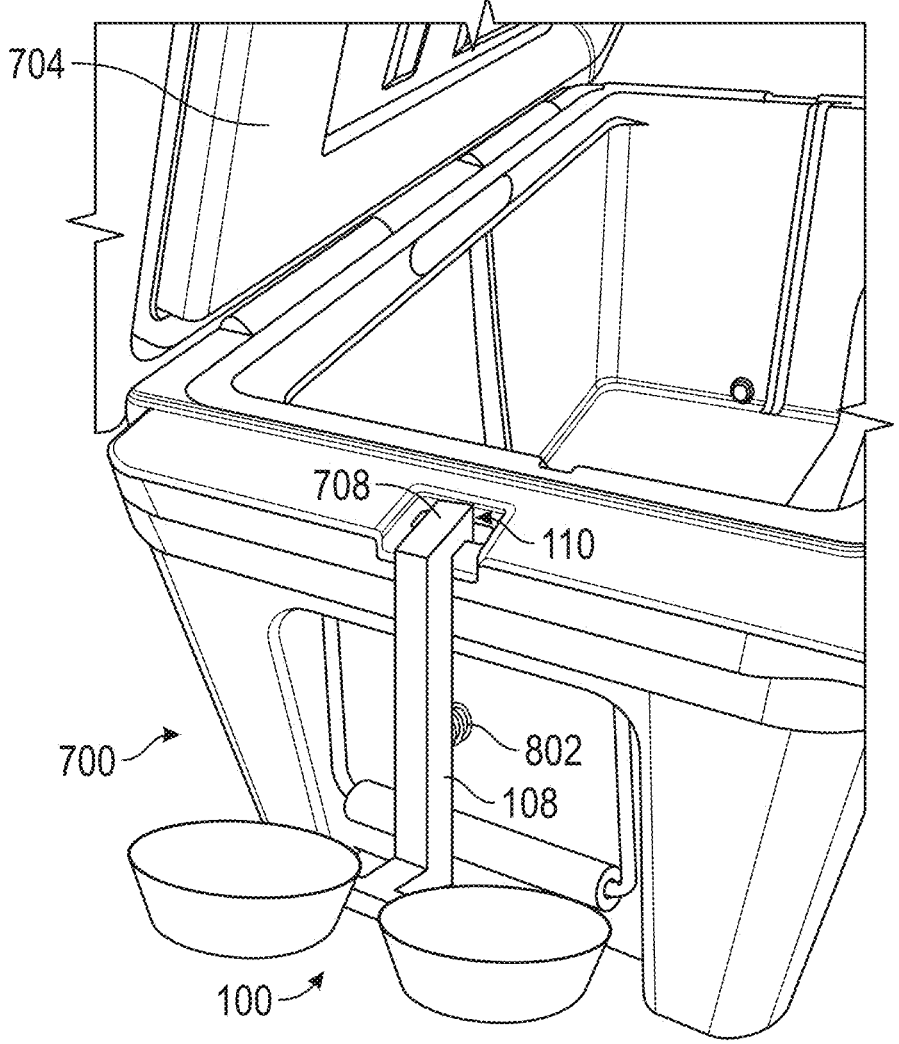
FIG. 8 illustrates a pet bowl mounted to an insulation storage container in accordance with some embodiments of the present disclosure.

FIG. 8 illustrates a container system 800 with a pet bowl 100 mounted on the insulation storage container 700 in accordance with example embodiments. As illustrated, the hook portion 110 of the pet bowl 100 may be engaged with the slot 708 of the insulation storage container 700. For example, the hook portion 110 is positioned in the slot 708 to mount the pet bowl 100 on the insulation storage container 700. To secure the pet bowl 100 to the insulation storage container 700, the lid 704 may be closed. The hook portion 110 may be sized so that the lid 704 may be closed with the hook portion 110 positioned in the slot 708. In the illustrated embodiment, a spring device 802 may also be incorporated into the construction of pet bowl 100. The spring device 802 may be configured to diminish movement that may occur during the usage of pet bowl 100 while pet bowl 100 is installed on insulation storage container 700. It should be understood that insulation storage container 700 is merely one example of a container for use in example embodiments. The pet bowl 100 may be used with other containers having slots suitable for attachment by the pet bowl 100.

Any of a variety of suitable techniques may be used for manufacturing the pet bowl 100 in accordance with example embodiments. For example, the pet bowl 100 may be made through additive manufacturing (e.g., three-dimensional printing) or injection molding. In some embodiments, additive manufacturing and/or injection molding may be used to manufacture the pet bowl 100 with the support bracket 106 and corresponding containers (e.g., first container 102 and second container 104 or container 500) being integrally formed to be a unitary body. In some embodiments, a thermoplastic may be processed to form the pet bowl 100. For example, the pet bowl 100 may be made from additive manufacturing of a thermoplastic. By way of further example, the pet bowl 100 may made from injection molding of a thermoplastic. In some embodiments, two or more components of the pet bowl 100 may injection molded and/or additive manufactured, such two or more of the first container 102, the second container 104. the stem 108, and/or the hook portion 110 are injection molded from a thermoplastic Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. It is also to be understood that the terminology used herein is for the purpose of describing particular embodiments only and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. An apparatus for mounting to a container, comprising:
a support bracket comprising a hook portion and a stem that extends downwardly from the hook portion, wherein the hook portion comprises a first extension and a second extension, wherein the first extension extends at a right angle from a first end of the stem, wherein the first extension has a length of about 1 inch to about 5 inches and a thickness of about 0.125 inches to about 1.35 inches, wherein the second extension has a length of about 0.5 inch to about 5 inches and a thickness of about 0.125 inches to about 1.5 inches, and wherein the stem has a length of about 3 inches to about 15 inches;
a spacer at a second end of the stem; and a pet bowl coupled to the spacer and having a volume of about 6 fluid ounces to about 160 fluid ounces,
wherein the apparatus is integrally formed.

2. The apparatus of claim 1, wherein the pet bowl has a volume of about 6 fluid ounces to about 30 fluid ounces.

3. The apparatus of claim 1, further comprising a second pet bowl coupled to the stem and having and having a volume of about 6 fluid ounces to about 160 fluid ounces.

4. The apparatus of claim 1, wherein the apparatus is injection molded.

5. The apparatus of claim 1, where the apparatus is 3D printed.

6. The apparatus of claim 1, wherein the hook portion is an l-shaped bracket.

7. The apparatus of claim 1, wherein the stem has a length of about 6 inches to about 15 inches.

8. The apparatus of claim 1, wherein at least two or more of the hook portion, the stem, or the pet bowl are injection molded from a thermoplastic.

* * * * *